United States Patent
Kim et al.

(10) Patent No.: US 9,417,732 B2
(45) Date of Patent: Aug. 16, 2016

(54) DISPLAY APPARATUS AND METHOD OF DRIVING THE SAME

(75) Inventors: Heetae Kim, Yongin-si (KR); Hyeonyong Jang, Hwaseong-si (KR); Byungchoon Yang, Seoul (KR); Dongkwon Kim, Asan-si (KR); Young-keun Lee, Cheonan-si (KR); Ho-young Kim, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 471 days.

(21) Appl. No.: 13/187,826

(22) Filed: Jul. 21, 2011

(65) Prior Publication Data

US 2012/0081412 A1    Apr. 5, 2012

(30) Foreign Application Priority Data

Oct. 4, 2010    (KR) .......................... 10-2010-0096502

(51) Int. Cl.
*G09G 5/10* (2006.01)
*G06F 3/042* (2006.01)
*G09G 3/34* (2006.01)
*G06F 3/041* (2006.01)

(52) U.S. Cl.
CPC ............ *G06F 3/0421* (2013.01); *G06F 3/0412* (2013.01); *G09G 3/3406* (2013.01); *G09G 2320/045* (2013.01); *G09G 2320/0633* (2013.01); *G09G 2360/145* (2013.01)

(58) Field of Classification Search
CPC ............... G09G 2320/045; G09G 2320/0633; G09G 2360/145
USPC .......................................... 345/690, 102, 55
See application file for complete search history.

(56) References Cited

U.S. PATENT DOCUMENTS

| | | | |
|---|---|---|---|
| 6,223,876 B1 * | 5/2001 | Walsh et al. | 194/207 |
| 6,303,916 B1 * | 10/2001 | Gladnick | G05D 25/02 250/205 |
| 6,797,933 B1 * | 9/2004 | Mendis et al. | 250/208.1 |
| 7,145,142 B2 | 12/2006 | Funaki et al. | |
| 2003/0113783 A1 | 6/2003 | Funaki et al. | |
| 2005/0275616 A1 | 12/2005 | Park et al. | |
| 2006/0114272 A1 * | 6/2006 | Taniguchi et al. | 345/690 |
| 2007/0279508 A1 * | 12/2007 | Fowler | 348/311 |
| 2008/0122803 A1 * | 5/2008 | Izadi | G06F 3/0421 345/175 |

(Continued)

FOREIGN PATENT DOCUMENTS

| | | |
|---|---|---|
| CN | 1842840 A | 10/2006 |
| JP | 11020991 A | 1/1999 |
| JP | 2003337657 A | 11/2003 |
| JP | 2006092551 A | 4/2006 |

(Continued)

*Primary Examiner* — William Boddie
*Assistant Examiner* — Leonid Shapiro
(74) *Attorney, Agent, or Firm* — Cantor Colburn LLP

(57) ABSTRACT

A display apparatus includes a display panel, a backlight unit, a backlight control circuit, sensors, a read-out circuit and a sensor auxiliary circuit. The display panel includes pixels and displays an image. The backlight unit includes a first light source which emits a first light in a infrared light range. The backlight control circuit controls a brightness of the first light source. The sensors sense an external signal and outputs first sensing signals. The read-out circuit outputs the first sensing signals as second sensing signals. The sensor auxiliary circuit compares a maximum value and a minimum value of the second sensing signals and provides a brightness control signal to the backlight control circuit based on the compared difference to control the brightness of the first light source.

12 Claims, 7 Drawing Sheets

(56) References Cited

U.S. PATENT DOCUMENTS

2009/0321640 A1* 12/2009 Onogi .................. 250/338.1
2010/0007632 A1* 1/2010 Yamazaki ............... 345/175
2012/0256818 A1* 10/2012 Kuroki .................. 345/102
2015/0179072 A1* 6/2015 Karner ............. B29C 45/0017
   348/148

FOREIGN PATENT DOCUMENTS

| | | |
|---|---|---|
| KR | 1020040021463 | 3/2004 |
| KR | 1020040065379 | 7/2004 |
| KR | 1020100006022 | 1/2010 |
| WO | 2010084641 A1 | 7/2010 |

* cited by examiner

DISPLAY APPARATUS AND METHOD OF DRIVING THE SAME

This application claims priority to Korean Patent Application No. 10-2010-0096502, filed on Oct. 4, 2010, and all the benefits accruing therefrom under 35 U.S.C. §119, the content of which in its entirety is herein incorporated by reference.

BACKGROUND OF THE INVENTION (1) Field of the Invention

The general inventive concepts relate to a display apparatus and a method of driving the display apparatus. More particularly, exemplary embodiments of the present invention relate to a display apparatus with improved sensing capability and a method of driving the display apparatus.

(2) Description of the Related Art

A display apparatus in which a touch panel is employed is widely used since the display apparatus having a touch panel may be used without additional input devices, such as keyboard, mouse, scanner, etc.

Sensors employed in the touch panel are typically disposed inside or on a display panel. However, since the sensors disposed inside or on the display panel sense an external signal using light provided from a backlight assembly or using light from an exterior, the sensing capability of the sensors is substantially reduced as time lapses.

SUMMARY OF THE INVENTION

Exemplary embodiments of the present invention provide a display apparatus with improved sensing capability.

Exemplary embodiments of the present invention provide a method of driving the display apparatus.

In an exemplary embodiment, a display apparatus includes a display panel, a backlight unit, a backlight control circuit, a plurality of sensors, a read-out circuit and a sensor auxiliary circuit.

The display panel includes a plurality of pixels, where the display panel displays an image. The backlight unit includes a first light source which emits a first light in a infrared light range, where the backlight unit provides the first light to the display panel. The backlight control circuit controls a brightness of the first light source.

The plurality of sensors sense an external signal and outputs a plurality of first sensing signals. The read-out circuit stores the plurality of first sensing signals and outputs a plurality of second sensing signals during a predetermined time period. The sensor auxiliary circuit receives the plurality of second sensing signals, compares a maximum value and a minimum value in the plurality of second sensing signals, and provides a brightness control signal to the backlight control circuit based on the compared difference to control the brightness of the first light source.

In an exemplary embodiment, a method of driving a display apparatus includes: receiving a plurality of first sensing signals corresponding to an external signal; storing the plurality of first sensing signals and outputting a plurality of second sensing signals at a predetermined time; comparing a difference between a maximum value and a minimum value of the plurality of second signals with a reference value; and controlling a brightness of an infrared-light light source in the backlight unit based on the compared difference.

In an exemplary embodiment, the aging of the plurality of sensors included in the display apparatus is sensed, and thus the brightness of the infrared-light light source is controlled such that a reduction of sensing capability of the sensors due to the aging of the plurality of sensors is effectively prevented.

BRIEF DESCRIPTION OF THE DRAWINGS

The above and other advantages of this disclosure will become readily apparent by describing in further detail exemplary embodiments thereof with reference to the accompanying drawings, in which.

DETAILED DESCRIPTION OF THE INVENTION

Figure 1:
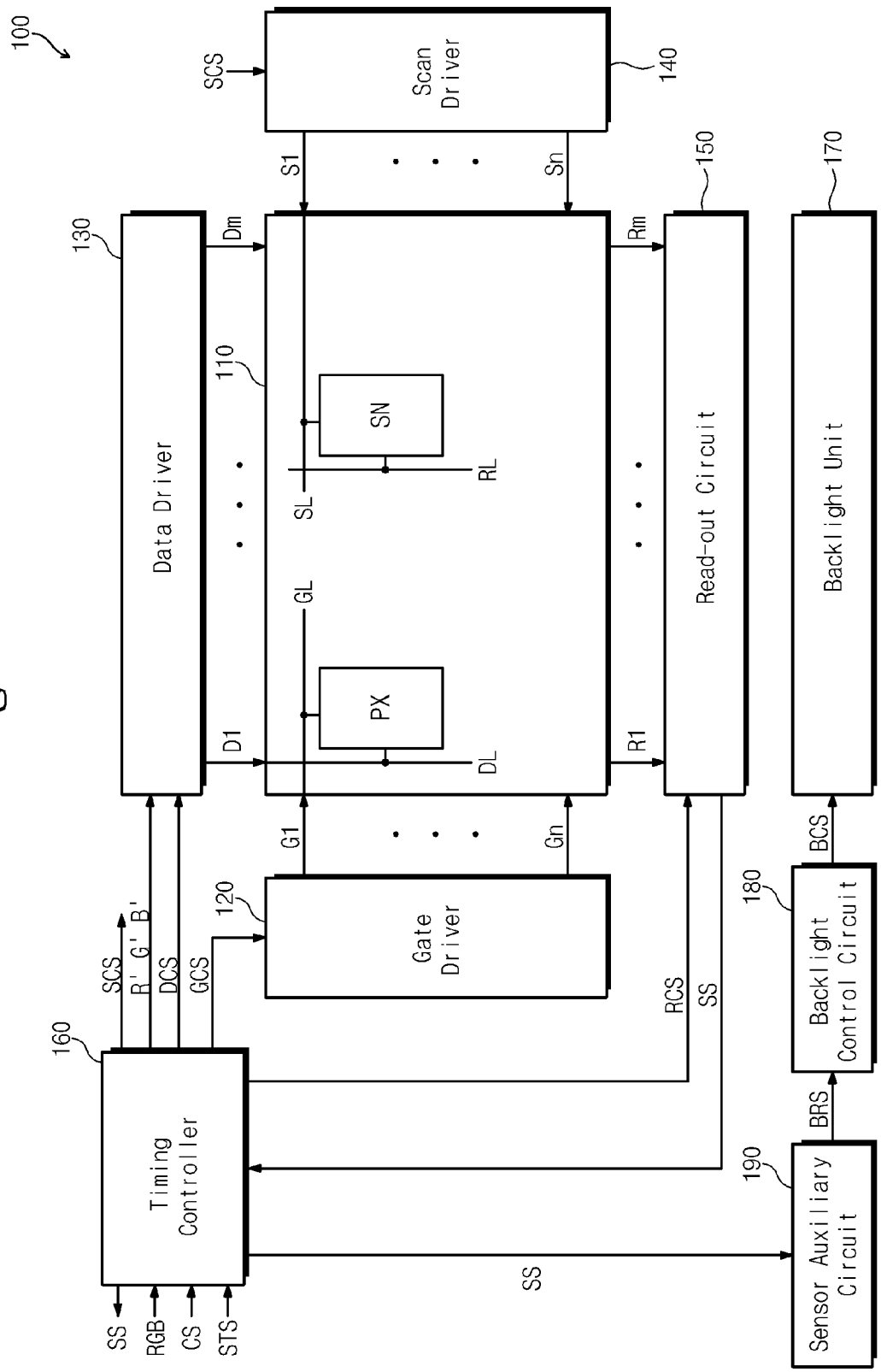
FIG. 1 is a block diagram showing an exemplary embodiment of a display apparatus according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of a display apparatus will be explained in detail with reference to the accompanying drawings.

Figure 2:
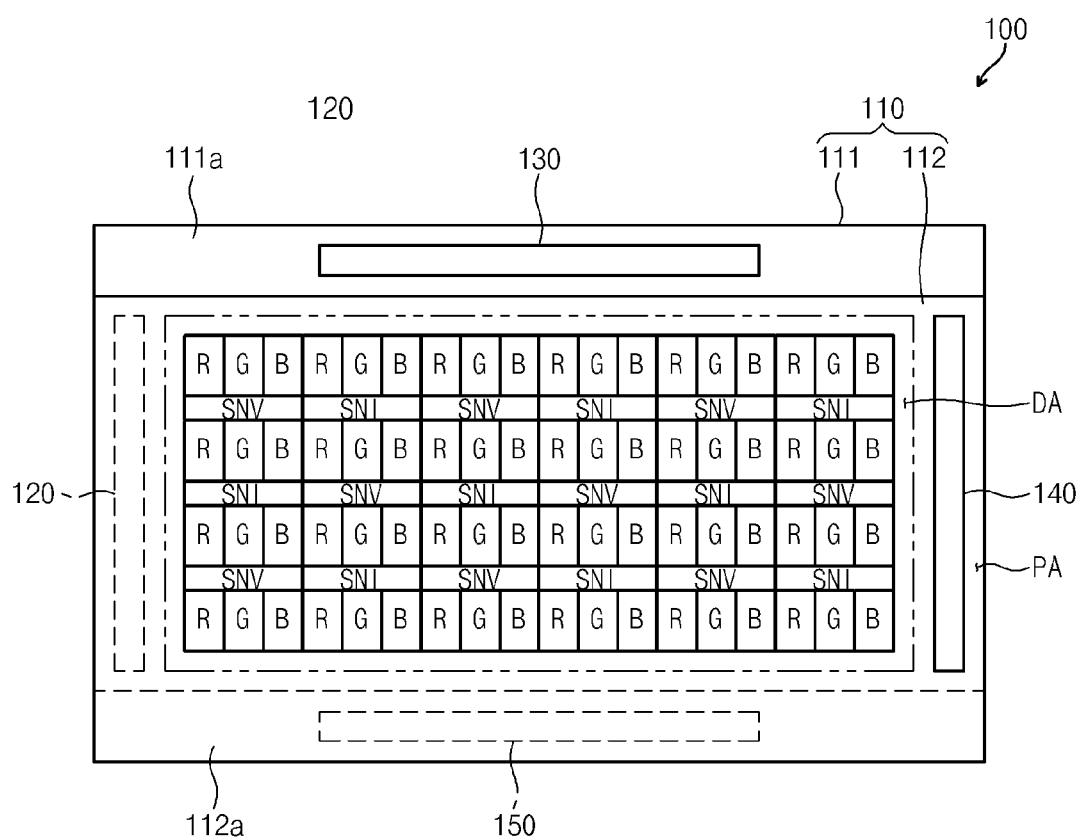
FIG. 2 is a top plan view of the display apparatus of FIG. 1.
Figure 3:
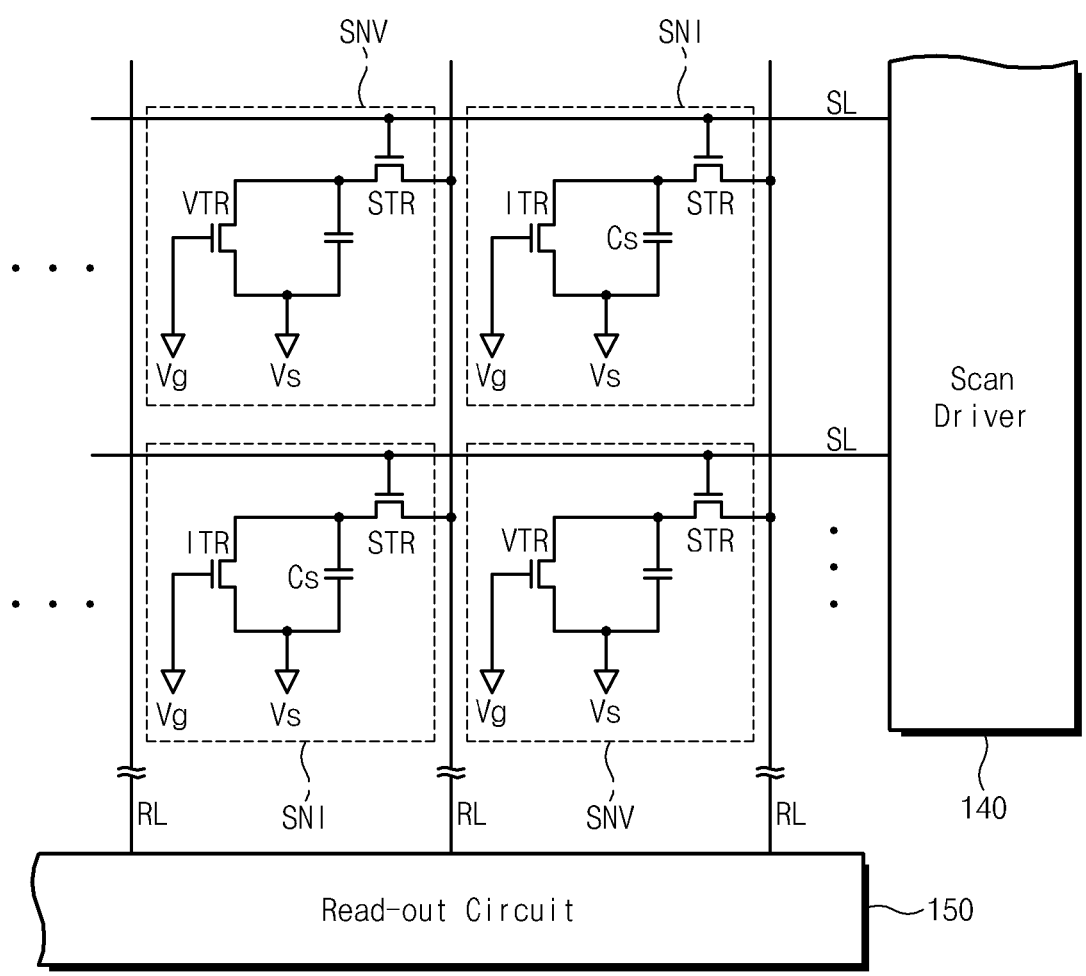
FIG. 3 is a schematic circuit diagram showing an exemplary embodiment of sensors of FIG. 1.

FIG. 1 is a block diagram showing an exemplary embodiment of a display apparatus according to the present invention, FIG. 2 is a top plan view showing the display apparatus of FIG. 1, and FIG. 3 is a schematic circuit diagram showing an exemplary embodiment of sensors of FIG. 1.

Referring to FIG. 1, the display apparatus 100 includes a display panel 110, a gate driver 120, a data driver 130, a scan driver 140, a read-out circuit 150, a timing controller 160, a backlight unit 170, a backlight control circuit 180 and a sensor auxiliary circuit 190.

The timing controller 160 receives an image signal RGB and a control signal CS from outside of the display apparatus 100. The timing controller 160 converts a data format of the image signal RGB, such that the image signal RGB is converted into a converted image signal R'G'B' having a data format corresponding to an interface between the data driver 130 and the timing controller 160, and provides the converted image signal R'G'B' to the data driver 130. In addition, the timing controller 160 provides a data control signal DCS, such as output start signal, horizontal start signal, polarity inversion signal, for example, to the data driver 130.

The timing controller 160 provides a gate control signal GCS, such as vertical start signal, vertical clock signal, vertical clock bar signal, for example, to the gate driver 120. The timing controller 160 provides a sensor control signal SCS, such as start signal, first clock signal, second clock signal, for example, to the scan driver 140. In addition, the timing controller 160 provides a read-out control signal RCS, e.g., a sensing clock signal, to the read-out circuit 150.

The gate driver 120 sequentially outputs gate signals G1 to Gn in response to the gate control signal GCS applied from the timing controller 160. The gate signals G1 to Gn are applied to the display panel 110.

The data driver 130 converts the converted image signal R'G'B' into data voltages D1 to Dm in response to the data control signal DCS applied from the timing controller 160 and outputs the data voltages D1 to Dm. The data voltages D1 to Dm are applied to the display panel 110.

The scan driver 140 sequentially outputs scan signals S1 to Sn in response to the sensor control signal SCS applied from the timing controller 160. The sensor control signal SCS may be synchronized with the gate control signal GCS.

The backlight unit 170 is disposed adjacent to the display panel 110 and supplies light to the display panel 110. Although not shown in FIG. 1, the backlight unit 110 may include a plurality of visible-light light source that emits visible light and a plurality of infrared-light light source that emits infrared light.

The backlight control circuit 180 provides a backlight control signal BCS to the backlight unit 170 to control the brightness of light sources in the backlight unit 170, more specifically, light-emitting intensity and light-emitting time of the light sources in the backlight unit 170, e.g., the plurality of visible-light light source and the plurality of infrared-light light source. Accordingly, the backlight control circuit 180 may control brightness of the visible light or the infrared light emitted from the backlight unit 170.

Referring to FIG. 2, the display panel 110 includes a first substrate 111, a second substrate 112 disposed opposite to, e.g., facing, the first substrate 111, and a liquid crystal layer (not shown) interposed between the first substrate 111 and the second substrate 112.

The display panel 110 includes a display area DA that displays an image and a peripheral area PA that surrounds at least a portion of the display area DA. A plurality of pixels R, G, and B and a plurality of sensors SNI and SNV are disposed in the display area DA. For the convenience of explanation, only a limited number of pixels and sensors are shown in FIG. 2, but the number of the pixels and the number of the sensors are not being limited thereto. In an alternative exemplary embodiment the number of the pixels and the number of the sensors may vary.

The pixels include a red pixel R that displays a red image, a green pixel G that displays a green image G, and a blue pixel B that displays a blue image. In addition, the sensors include a visible light sensor SNV that senses the light in the visible light range and an infrared light sensor SNI that senses the light in the infrared light range.

In an exemplary embodiment, the sensors SNV and SNI may be disposed between two pixels adjacent to each other, e.g., an area in which a black matrix is formed, and a reduction in the aperture ratio is thereby effectively prevented. In an exemplary embodiment, a single visible light sensor SNV or a single infrared light sensor SNI is provided for each three adjacent pixel including red, green and blue pixels R, G and B, as shown in FIG. 2.

The gate driver 120 and the scan driver may be disposed in the peripheral area PA. In an exemplary embodiment, the gate driver 120 is formed in a peripheral area of the first substrate through a thin film process, and the scan driver 140 is formed in a peripheral area of the second substrate 112 through a thin film process.

The first substrate 111 is coupled with the second substrate 112 such that the first substrate 111 partially overlaps the second substrate 112. That is, an end portion 111a of the first substrate 111 does not overlap the second substrate 112 and an end portion 112a of the second substrate 112 does not overlap the first substrate 111. Accordingly, the data driver 130 may be disposed on the end portion 111a of the first substrate and the read-out circuit 150 may be disposed on the end portion 112a of the second substrate 112. In an exemplary embodiment, the data driver 130 is mounted on the end portion 111a of the first substrate 111 in a chip-on-glass form, and the read-out circuit 150 is mounted on the end portion 112a of the second substrate 112 in a chip-on-glass form. In an alternative exemplary embodiment, the data driver 130 and the read-out circuit 150 may be prepared in a chip-on-film form.

Referring again to FIGS. 1 and 2, the display panel 110 includes a plurality of gate lines GL, a plurality of data lines DL crossing the gate lines GL and a plurality of pixels PX. The gate lines GL, the data lines DL, and the pixels PX may be disposed on the first substrate 111.

Although not shown in FIG. 1, each pixel PX includes a thin film transistor, a liquid crystal capacitor and a storage capacitor. The thin film transistor includes a gate electrode connected to a corresponding gate line of the gate lines GL, a source electrode connected to a corresponding data line of the data lines DL, and a drain electrode connected to a liquid crystal capacitor and a storage capacitor.

The gate lines GL are connected to the gate driver 120 and the data lines DL are connected to the data driver 130. The gate lines GL receive the gate signals G1 to Gn applied from the gate driver 120, and the data lines DL receive the data voltages D1 to Dm applied from the data driver 130.

The thin film transistor in each pixel PX is turned on in response to a corresponding gate signal applied through the corresponding gate line, and the data voltage applied to the corresponding data line is applied to a first electrode (hereinafter, referred to as "pixel electrode") of the liquid crystal capacitor through the turned-on thin film transistor. In an exemplary embodiment, a common voltage is applied to a second electrode (hereinafter, referred to as "common electrode") of the liquid crystal capacitor.

Thus, the liquid crystal capacitor is charged with a voltage corresponding to an electric potential difference between the common voltage and the data voltage. Each pixel PX may control light transmittance based on the level of voltage charged in the liquid crystal capacitor, thereby displaying an image.

The display panel 110 further includes a plurality of scan lines SL, a plurality of read-out lines RL crossing the scan lines SL and a plurality of sensors SN. The scan lines SL, the read-out lines RL, and the sensors SN may be disposed on the second substrate 112.

Since the sensors in the display panel 110 have substantially the same structure and function, only one sensor thereof has been shown in FIG. 1 for the convenience of explanation. The sensors will be described later in greater detail with reference to FIG. 3.

The scan lines SL are connected to the scan driver 140 and sequentially receive the scan signals S1 to Sn.

The read-out lines RL are connected to the read-out circuit 150 and provide the voltage charged in the sensors SN to the read-out circuit 150.

Referring now to FIG. 3, each sensor SN includes sensing transistors VTR and ITR, a switching transistor STR, and a sensing capacitor Cs. For the convenience of explanation, four sensors have been shown in FIG. 3.

The switching transistor STR includes a first electrode connected to a corresponding scan line of the scan lines SL, a second electrode connected to a corresponding read-out line of the read-out lines RL, and a third electrode connected to the sensing capacitor Cs and the sensing transistors VTR and ITR.

The sensing transistors VTR and ITR include an infrared-light sensing transistor ITR that senses light in the infrared light range and a visible-light sensing transistor VTR that senses light in the visible light range. In an exemplary embodiment, the infrared-light sensing transistor ITR may include silicon germanium (SiGe) and the visible-light sensing transistor VTR may include silicon (Si).

The sensing capacitor Cs includes a first electrode connected to the third electrode of the switching transistor STR and a second electrode to which a source voltage Vs is applied. In an exemplary embodiment, the source voltage Vs may be about −4 volts (V). In addition, each of the sensing transistors VTR and ITR includes a first electrode to which a gate voltage Vg is applied, a second electrode to which the source voltage Vs is applied, and a third electrode connected to the first electrode of the sensing capacitor Cs. In an exemplary embodiment, the gate voltage Vg may be about −9 V.

The sensing transistors VTR and ITR sense the light incident thereon from the exterior and output signals corresponding to an amount of the sensed light. In an exemplary embodiment, the sensing transistors VTR and ITR may include amorphous silicon.

The sensing capacitor Cs is charged with electric charges corresponding to the signal, e.g., photo current, output from the sensing transistors VTR and ITR. As the amount of the light incident to the sensing capacitor Cs increases, the amount of the electric charges charged in the sensing capacitor Cs increases. Accordingly, the voltage charged in the sensing capacitor Cs becomes high as the amount of the light incident to the sensing transistors VTR and ITR increases.

When a corresponding signal is input to each sensor SN, the switching transistor STR is turned on and the voltage charged in the sensing capacitor Cs is provided to the corresponding read-out line RL through the turned-on switching transistor STR.

The read-out circuit 150 stores sensing voltages R1 to Rm received from the read-out lines RL in response to the read-out control signal RCS applied from the timing controller 160 and sequentially provides the stored voltages to the timing controller 160 as sensing signals SS.

The timing controller 160 transmits the sensing signals SS to an external device to process data using the sensing signals SS. In an exemplary embodiment, the timing controller 160 transmits the sensing signals SS to the sensor auxiliary circuit 190 based on a sensor test signal STS that the timing controller receives from the exterior. In an alternative exemplary embodiment, the sensor test signal STS may be generated in the timing controller 160.

The sensor auxiliary circuit 190 receives the sensing signals SS to extract a maximum value and a minimum value from the stored voltages. The sensor auxiliary circuit 190 compares the maximum value and the minimum value and provides a brightness control signal BRS to the backlight control circuit 180 based on the compared result to control the brightness of the infrared-light light source.

In detail, when a difference between the maximum value and the minimum value is less than a predetermined reference value, the sensor auxiliary circuit 190 provides the brightness control signal BRS to the backlight control circuit 180 to increase the brightness of the infrared-light light source.

On the contrary, when the difference between the maximum value and the minimum value is larger than or equal to the predetermined reference value, the sensor auxiliary circuit 190 provides the brightness control signal BRS to the backlight control circuit 180 to maintain the brightness of the infrared-light light source. The sensor auxiliary circuit 190 will be described later in greater detail with reference to FIG. 5.

Figure 4:
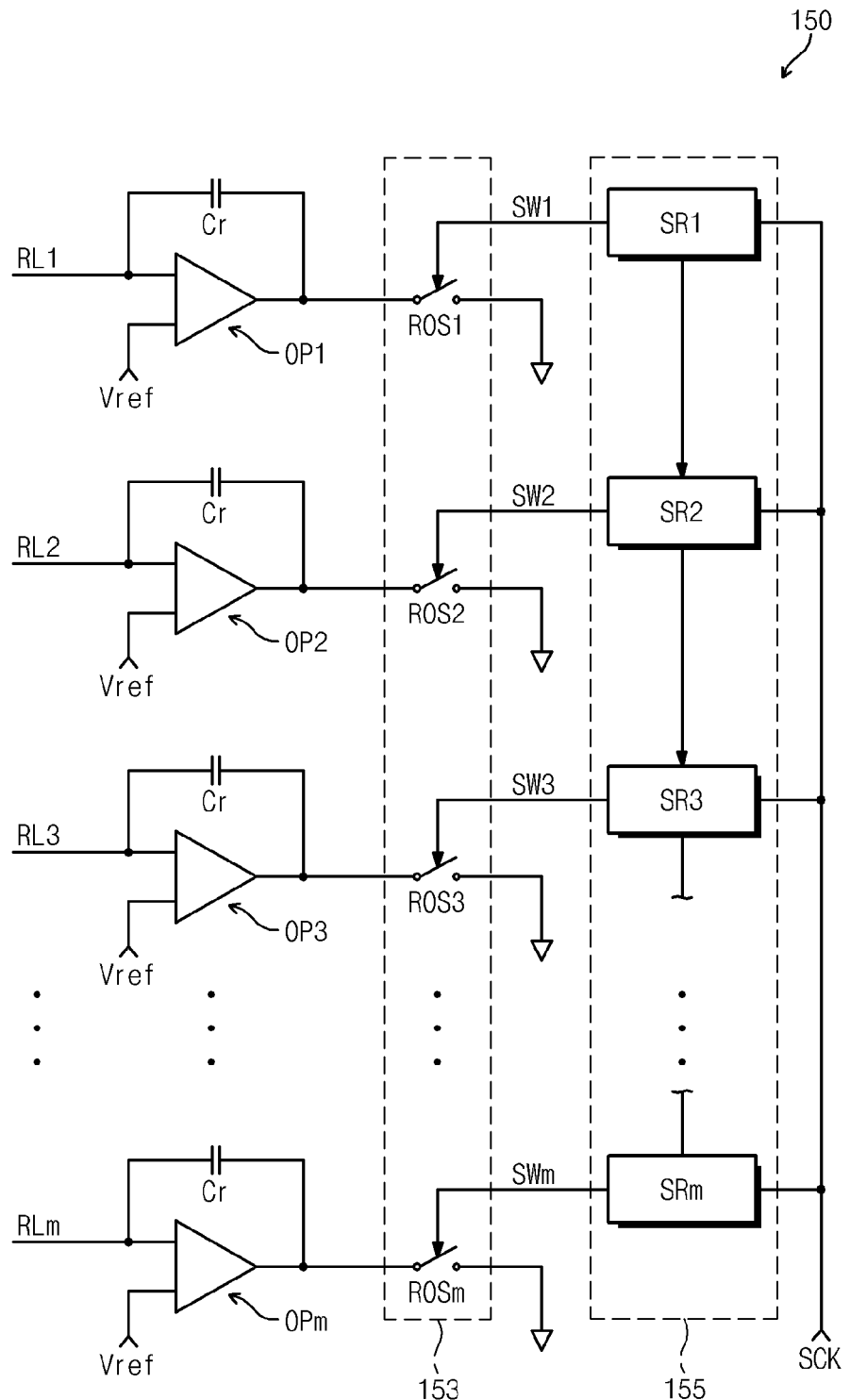
FIG. 4 is a schematic circuit diagram showing an exemplary embodiment of a read-out circuit in FIG. 1.

FIG. 4 is a schematic circuit diagram showing an exemplary embodiment of the read-out circuit of FIG. 1.

Referring to FIG. 4, the read-out circuit 150 includes a plurality of operational amplifiers OP1 to OPm, a read-out part 153 and a shift register 155.

Each of the operational amplifiers OP1 to OPm is connected to a corresponding read-out line of the read-out lines RL1 to RLm through a first input terminal thereof and receives the sensed voltage from a corresponding sensor SN. In addition, each of the operational amplifiers OP1 to OPm receives a reference voltage Vref through a second input terminal thereof. In an exemplary embodiment, the reference voltage Vref may be about 1.2 V.

When the sensed voltage is greater than the reference voltage Vref, each of the operational amplifiers OP1 to OPm outputs a corresponding sensing voltage of the sensing voltages R1 to Rm. Each of the operational amplifiers OP1 to OPm may receive the corresponding sensing voltage of the sensing voltages R1 to Rm from the corresponding read-out line of the read-out lines RL1 to RLm after the scan signal is applied to the corresponding sensor SN.

As shown in FIG. 4, a read-out capacitor Cr is connected to an output terminal and the first input terminal of each of the operational amplifiers OP1 to OPm. In an exemplary embodiment, a switching device may be connected to the read-out capacitor Cr in parallel.

The read-out part 153 includes a plurality of read-out switching devices ROS1 to ROSm, each of which is connected to the output terminal of a corresponding operational amplifier of the operational amplifiers OP1 to OPm.

The shift register 155 includes a plurality of stages SR1 to SRm and sequentially outputs switching signals SW1 to SWm to control the read-out switching devices ROS1 to ROSm. In particular, the shift register 155 sequentially outputs the switching signals SW1 to SWm through the stages SR1 to SRm in response to the sensing clock signal SCK applied from the timing controller 160.

The read-out switching devices ROS1 to ROSm are sequentially turned on in response to the switching signals SW1 to SWm that are sequentially output from the shift register 155 to sequentially provide the sensing signals SS to the timing controller 160, for example, voltages at the output terminals of the operational amplifiers OP1 to OPm. Accordingly, the timing controller 160 may sequentially receive the sensing voltages R1 to Rm sensed by the sensors SN included in one row of the display panel 110.

Figure 5:
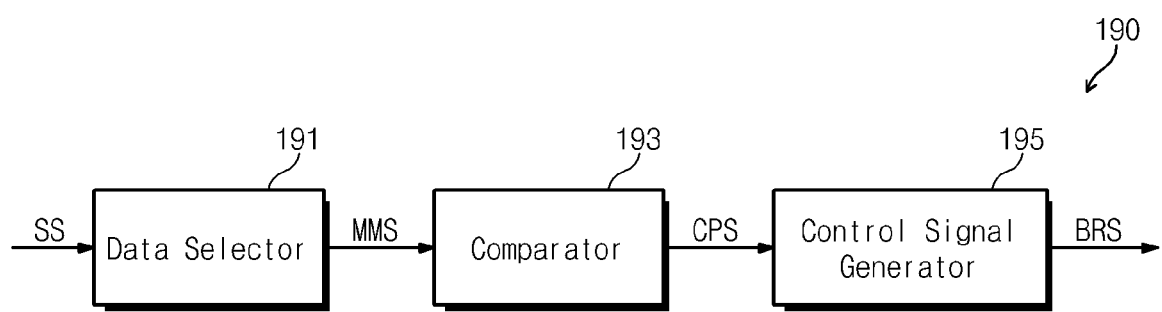
FIG. 5 is a block diagram showing an exemplary embodiment of a sensor auxiliary circuit in FIG. 1.

FIG. 5 is a block diagram showing an exemplary embodiment of the sensor auxiliary circuit of FIG. 1.

Referring to FIG. 5, the sensor auxiliary circuit 190 includes a data selector 191, a comparator 193 and a control signal generator 195.

The data selector 191 receives the sensing signals SS from the timing controller 160 and extracts maximum value and minimum value of the sensing voltages R1 to Rm. The data selector 191 applies signals MMS corresponding to the maximum value and the minimum value to the comparator 193. The maximum value and the minimum value may be selected from the voltages sensed in a time period corresponding to a single frame period.

The comparator 193 determines whether the brightness of the infrared-light light source, that is, the brightness of light emitted by the infrared-light light source, is controlled or not using the maximum value and the minimum value and outputs a comparison signal CPS. Particularly, the comparator 193 compares the difference between the maximum value and the minimum value to the predetermined reference value. Then, when the difference between the maximum value and the minimum value is greater than or equal to the predetermined reference value, the comparator 193 outputs a first control signal to maintain the brightness of the infrared-light light source. When the difference between the maximum value and the minimum value is less than the predetermined reference value, the comparator 193 outputs a second control signal to increase the brightness of the infrared-light light source.

The control signal generator 195 receives the comparison signal CPS from the comparator 193 and outputs the brightness control signal BRS to maintain or to increase the brightness of the infrared-light light source. In particular, the control signal generator 195 outputs a first brightness control signal to maintain the brightness of the infrared-light light source in response to the first control signal applied from the comparator 193. In addition, the control signal generator 195 outputs a second brightness control signal to increase the brightness of the infrared-light light source in response to the second control signal applied from the comparator 193.

In an alternative exemplary embodiment, the control signal generator 195 may output the brightness control signal BRS including brightness information to control the brightness of the infrared-light light source based on the difference between the maximum value and the minimum value, and the predetermined reference value.

When the backlight control circuit 180 receives the first brightness control signal from the control signal generator 195, the backlight control circuit 180 may control light-emitting intensity (e.g., pulse amplitude) and light-emitting time (e.g., pulse width) of the light sources included in the backlight unit 170 to be maintained substantially identical to light-emitting intensity and light-emitting time of the light sources in a previous state.

In addition, when the backlight control circuit 180 receives the second brightness control signal from the control signal generator 195, the backlight control circuit 180 may control the light-emitting intensity and the light-emitting time (i.e., dimming duty) of the light sources of the backlight unit 170 to be increased and compared to the light-emitting intensity and the light-emitting time of the light sources in the previous state. The light-emitting intensity or the dimming duty may be increased based on the brightness control signal BRS including the brightness information of light to be emitted by the infrared-light light source.

Figure 6:
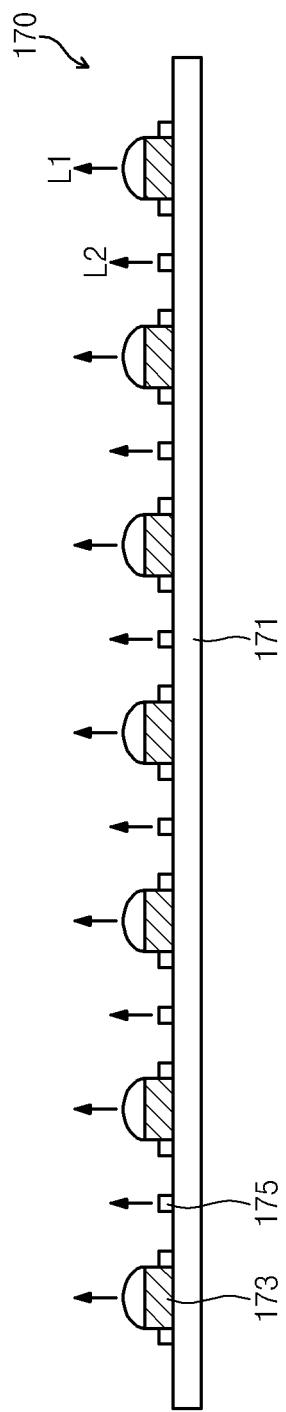
FIG. 6 is a cross-sectional view of an exemplary embodiment of a backlight unit in FIG. 1.

FIG. 6 is a sectional view showing an exemplary embodiment of the backlight unit of FIG. 1.

Referring to FIG. 6, the backlight unit 170 includes a circuit substrate 171 disposed under the display panel 110, a plurality of visible-light light source 173 disposed on the circuit substrate 171 to emit light L1 in the visible light range, and a plurality of infrared-light light source 175 disposed on the circuit substrate 171 to emit light L2 in the infrared light range. The visible-light light sources 173 may be a light source that emits a white light or a light source that emits light of red, green and blue colors.

The visible-light light sources 173 and the infrared-light light sources 175 may be alternately arranged. In an exemplary embodiment, one infrared-light light source may be arranged between two visible-light light sources adjacent to each other. In an exemplary embodiment, the visible-light light sources 173 and the infrared-light light sources 175 may include light emitting diodes.

Although not shown in FIG. 6, the visible light L1 emitted from the visible-light light sources 175 is incident to the display panel 110 and passes through the liquid crystal layer. The light transmittance of the liquid crystal layer is controlled by an electric field generated between the pixel electrode and the common electrode. Accordingly, the display panel 110 may control the transmittance of the visible light L1 by controlling the liquid crystal layer, thereby displaying images having predetermined gray scale levels.

The infrared light L2 emitted from the infrared-light light sources 173 is incident to the display panel 110 and passes through the display panel 110. Since the infrared light L2 passed through the display panel 110 is not perceived by a user, the infrared light L2 does not exert an adverse influence on the user's perception of the image displayed on the display panel 110.

However, the infrared light L2 passed through the display panel 110 travels to the exterior of the display panel 110 but the infrared light L2 may be reflected by objects (e.g., finger) when the objects exist on the display panel 110.

The infrared light L2 reflected by the objects may be sensed by the sensing transistors VTR and ITR arranged in the display panel 110. That is, the reflected infrared light L2 is incident to a sensing layer (e.g., an amorphous silicon layer) of the sensing transistors VTR and ITR and a photo current generated from the sensing transistors VTR and ITR is changed based on an amount of the reflected infrared light L2.

Figure 7:
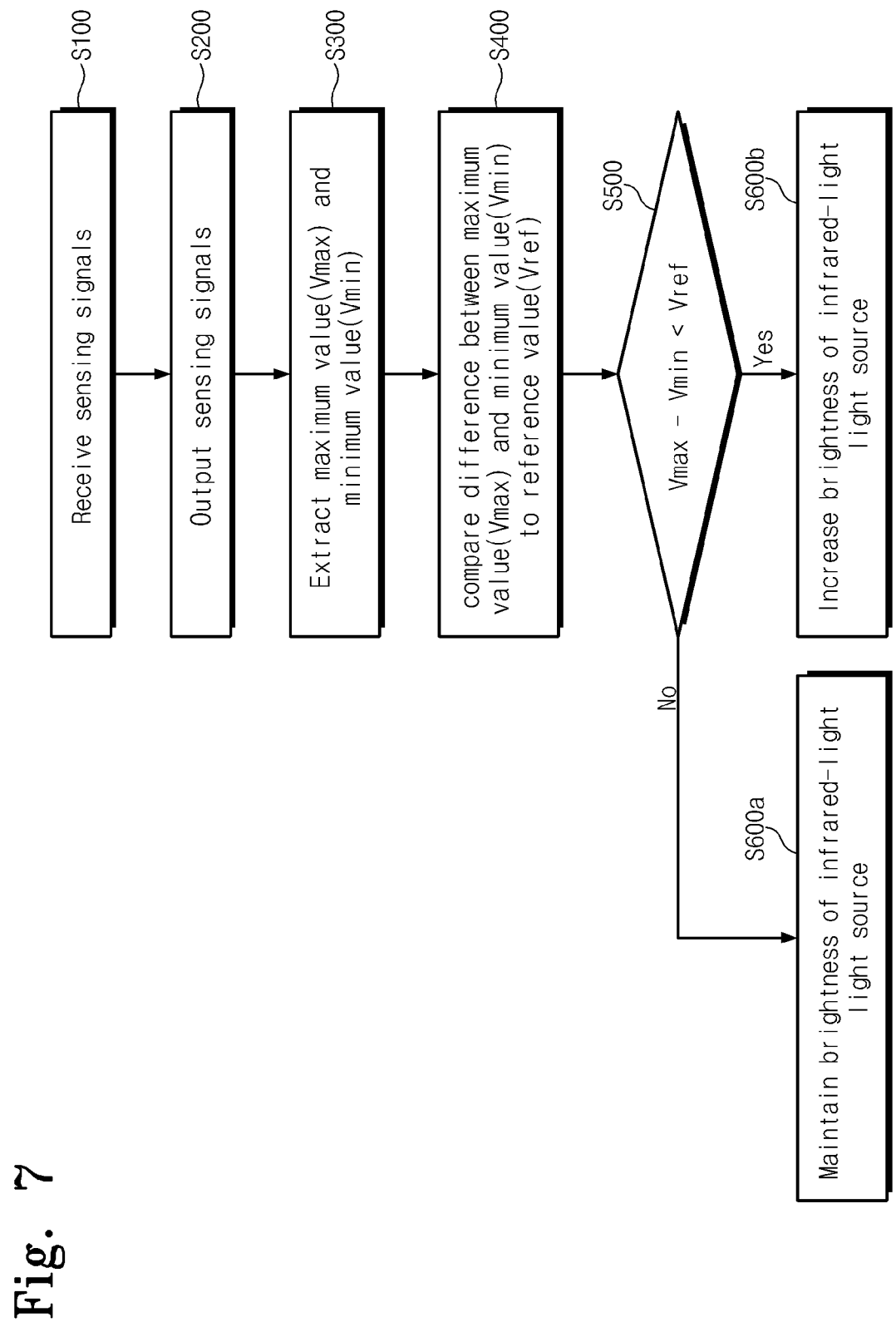
FIG. 7 is a flowchart showing an exemplary embodiment of a method of driving the display apparatus of FIG. 1.

FIG. 7 is a flowchart showing an exemplary embodiment of a method of driving the display apparatus of FIG. 1.

The sensing signals generated from the sensors that sense external signal are received (S100). Then, the sensing signals are charged and the charged sensing signals are output at a predetermined timing (S200). Maximum value Vmax and Minimum value Vmin of the sensing signals are extracted from the sensing signals (S300). In an exemplary embodiment, the maximum value Vmax and the minimum value Vmin may be selected from the voltages sensed in a time period corresponding to at least one frame period.

Then, the difference between the maximum value Vmax and the minimum value Vmin is compared to the predetermined reference value Vref (S400). When the difference between the maximum value Vmax and the minimum value Vmin is greater than or equal to the predetermined reference value Vref, the brightness of the infrared-light light source is maintained to be substantially identical to the brightness of the infrared-light light source in a previous state (S500 and S600a). When the difference between the maximum value Vmax and the minimum value Vmin is less than the predetermined reference value Vref, the brightness of the infrared-light light source is increased (S500 and S600b).

Hereinafter, the driving method will be described in greater detail, but numerical values described below are examples for the sake of convenience of explanation, and the voltages of the sensing capacitors Cs and the infrared-light light sources are not limited thereto.

When objects that reflect the infrared light do not exist on the display panel 110, the sensing capacitor Cs is charged with a voltage of about 1.2 V by the infrared-light sensing transistor ITR and the voltage is output at about 0 V through the read-out circuit 150.

When the objects reflecting the infrared light do exist on the display panel 110, the sensing capacitor Cs is charged with a voltage of about 2.2 V by the infrared-light sensing transistor ITR and outputs a voltage of about 1.0 V through the read-out circuit 150. In an exemplary embodiment, an external device that receives the voltage may sense 255 gray scale levels in the range of about 1.0 V.

When the infrared-light sensing transistors ITR are substantially degraded due to aging as time lapses, the sensing capacitor Cs might not be charged with the voltage of about 2.2 V even though the objects that reflect the infrared light exist on the display panel 110. As a result, the sensing capability of the infrared-light sensor is substantially reduced.

Therefore, when the voltage output from the read-out circuit 150 does not exceed about 0.3 V during the time period, e.g., the at least one frame periods, the light output from the infrared-light light source of the backlight unit 170 may be increased by at least about 5%, and the sensing capability of the infrared-light sensor is thereby effectively prevented from being reduced due to aging.

Although the exemplary embodiments of the present invention have been described, it is understood that the present invention should not be limited to these exemplary embodiments but various changes and modifications may be made by one ordinary skilled in the art within the spirit and scope of the present invention as hereinafter claimed.

What is claimed is:

1. A display apparatus comprising:
   a display panel comprising a plurality of pixels, wherein the display panel displays an image;
   a backlight unit comprising a first light source which emits a first light in an infrared light range, the backlight unit providing the first light to the display panel;
   a backlight control circuit which controls a brightness of the first light source;
   a plurality of sensors which senses an external signal corresponding to the first light reflected by an object on the display panel and outputs a plurality of first sensing signals;
   a read-out circuit which stores the plurality of first sensing signals and outputs a plurality of second sensing signals during a predetermined time period; and
   a sensor auxiliary circuit which receives the plurality of second sensing signals, compares a maximum value and a minimum value in the plurality of second sensing signals and provides a brightness control signal to the backlight control circuit based on the compared difference to control the brightness of the first light source to prevent reduced sensing capability of the plurality of sensors as time lapses,
   wherein the sensor auxiliary circuit comprises:
   a data selector which receives the plurality of second sensing signals and outputs the maximum value and the minimum value;
   a comparator which compares a difference between the maximum value and the minimum value with a predetermined reference value, outputs a first control signal when the difference between the maximum value and the minimum value is greater than or equal to the reference value, and outputs a second control signal when the difference between the maximum value and the minimum value is less than the reference value; and
   a control signal generator which outputs a first brightness control signal in response to the first control signal to maintain the brightness of the first light source and outputs a second brightness control signal in response to the second control signal to increase the brightness of the first light source.

2. The display apparatus of claim 1, wherein the plurality of sensors comprise:
   a visible light sensor which senses light in the visible light range; and
   an infrared light sensor which senses light in the infrared light range.

3. The display apparatus of claim 2, wherein the visible light sensor and the infrared light sensor are alternately arranged between two adjacent pixels as viewed from a top plan view.

4. The display apparatus of claim 1, wherein the display panel comprises:
   a first substrate; and
   a second substrate comprising a plurality of color filters and disposed opposite to the first substrate,
   wherein the plurality of sensors is disposed inside the second substrate.

5. The display apparatus of claim 1, wherein the backlight control circuit increases the brightness of the first light source using a pulse-width modulation method.

6. The display apparatus of claim 1, wherein the backlight control circuit increases the brightness of the first light source using a pulse-amplitude modulation method.

7. The display apparatus of claim 1, further comprising a timing controller which receives the plurality of second sensing signals from the read-out circuit and provides the plurality of second sensing signals to the sensor auxiliary circuit in response to a sensor test signal, wherein the sensor test signal is provided from an external device or generated from the timing controller.

8. The display apparatus of claim 7, wherein the sensor auxiliary circuit is included in the timing controller.

9. The display apparatus of claim 1, further comprising a scan driver which sequentially applies a scan signal to the plurality of sensors,
   wherein the display panel further comprises:
   a plurality of scan lines which sequentially receives the scan signal; and
   a plurality of read-out lines which receives the plurality of first sensing signals from the plurality of sensors.

10. The display apparatus of claim 1, wherein the read-out circuit comprises:
    a plurality of operational amplifiers, wherein each of the plurality of operational amplifiers receives a corresponding first sensing signal of the plurality of first sensing signals from a corresponding read-out line of the plurality of read-out lines and compares the corresponding first sensing signal to a predetermined reference voltage to output a difference between the first sensing signal and the reference voltage as a corresponding second sensing signal when the first sensing signal is greater than the reference voltage;
    a read-out part which sequentially outputs the plurality of second sensing signals in response to a plurality of switching signals; and
    a shift register which sequentially provides the plurality of switching signals to the read-out part.

11. The display apparatus of claim 1, wherein the backlight unit further comprises a second light source which emits a second light in a visible light range, and the backlight unit provides the second light to the display panel.

12. The display apparatus of claim 1, wherein the read-out circuit outputs the plurality of first sensing signals as the plurality of second sensing signals.

* * * * *